(12) United States Patent
Ejiri

(10) Patent No.: US 6,383,605 B1
(45) Date of Patent: May 7, 2002

(54) MAGNETIC RECORDING MEDIUM

(75) Inventor: Kiyomi Ejiri, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/556,326

(22) Filed: Apr. 24, 2000

(30) Foreign Application Priority Data

Apr. 22, 1999 (JP) .......................................... 11-115189

(51) Int. Cl.$^7$ ................................................. G11B 5/70

(52) U.S. Cl. ....................... 428/141; 428/216; 428/323; 428/328; 428/694 SG; 428/694 BS; 428/694 BG; 428/900

(58) Field of Search ................................. 428/141, 216, 428/323, 328, 694 SG, 694 BS, 694 BG, 900

(56) References Cited

U.S. PATENT DOCUMENTS 6,057,021 A * 5/2000 Ishikawa et al. ........... 428/65.3

* cited by examiner

Primary Examiner—Stevan A. Resan
(74) Attorney, Agent, or Firm—Sughrue Mion, PLLC

(57) ABSTRACT

Disclosed is a magnetic recording medium comprising a flexible nonmagnetic support, a nonmagnetic layer containing nonmagnetic powder and a binder on the support, and a magnetic layer containing ferromagnetic powder and a binder on the nonmagnetic layer. The magnetic layer has an average thickness of from 0.01 or higher to 0.3 $\mu$m or lower, and the nonmagnetic layer has an average thickness of 0.5 $\mu$m or lower. The side of the flexible nonmagnetic support to which the nonmagnetic layer and the magnetic layer are formed has a PSD equal to or less than 0.5 nm$^2$ in the wavelength of from 1 to 5 $\mu$m, and a PSD of 0.02 to 0.5 nm$^2$ in the wavelength of from 0.5 $\mu$m or higher to less than 1 $\mu$m according to a surface roughness spectrum measured with an atomic force microscope. The flexible nonmagnetic support has a ratio, HD/TD, of Young's modulus in the direction of MD to the direction of TD of 1/5 or higher to 1/1 or lower.

20 Claims, No Drawings

MAGNETIC RECORDING MEDIUM

BACKGROUND OF THE INVENTION

1. Field of the Invention

This invention relates to a magnetic recording medium exhibiting a high output and a good C/N ratio under high-density recording.

2. Description of Related Art

In recent years, a recording wavelength tends to be shorter along with high densification, and if the magnetic layer is thick, the output tends to be lowered, thereby raising problems in a self-demagnetization loss during recording and a thickness loss during reproducing. Therefore, a magnetic layer is tried to be thinner, but the is influence of a nonmagnetic support may easily appear on the surface of the magnetic layer when the magnetic layer of 2 $\mu$m. or less is directly applied to the support, and a deteriorating tendency in electromagnetic characteristics or dropouts is seen.

As a means to solve such problems, there is a method for forming, by using a simultaneous multiplayer coating technique, on a support, a nonmagnetic layer and a magnetic layer in this order, thereby coating high concentration magnetic coating liquid with a thin thickness as disclosed in Japanese Unexamined Patent Publication (KOKAI) Showa No. 63-191,315 and U.S. Pat. No. 4,863,793. With these inventions, production yields were remarkably improved, and good electromagnetic characteristics were gained. However, a recording and reproducing system with a further narrowed track width has been developed to further improve a recording density.

In response to this, the inventors propose, for the purpose of improving a medium output, that a lower layer thickness be less than 0.5 $\mu$m to enhance Hc of the respective longitudinal, width and normal direction of the magnetic layer (See Japanese Uhexamined Patent (KOKAI) Heisei No. 8-339,526; hereinafter referred to as Patent Publication (1)). Along with digitalization of recording signals, however, it has been strongly requested to reduce noises caused by not only an output but also surface roughness or distribution condition of magnetic powder.

SUMMARY OF THE INVENTION

It is an object of the present invention to provide a magnetic recording medium exhibiting a high output and a high C/N ratio (low noises) during high-density magnetic recording.

The inventors have diligently researched structures of magnetic layers and nonmagnetic layers, and the surface roughness, the Young's modulus or the like of the support to accomplish the above object. Consequently, they have found out that the above object could be accomplished by a magnetic recording medium comprising a flexible nonmagnetic support, a nonmagnetic layer containing nonmagnetic powder and a binder formed on the flexible nonmagnetic support and a magnetic layer containing ferromagnetic powder and a binder formed on the nonmagnetic layer, wherein the magnetic layer has an average thickness in the range of from 0.01 $\mu$m. to 0.3 $\mu$m., the nonmagnetic layer has an average thickness equal to or less than 0.5 $\mu$m., and, according to a surface roughness spectrum measured with an atomic force microscope, the side of the flexible nonmagnetic support to which the nonmagnetic layer and the magnetic layer are formed has a power spectrum density of roughness (abbreviated to "PSD" hereinafter) equal to or less than 0.5 nm$^2$ in the wavelength of from 1 to 5 $\mu$m. and a PSD of 0.02 to 0.5 nm$^2$ in the wavelength of from 0.5 $\mu$m. or higher to less than 1 .m, and the flexible nonmagnetic support has a ratio, MD/TD, of Young's modulus in the direction of MD to the direction of TD in the range of from 1/5 to 1/1.

As for the magnetic recording medium of the invention, it is preferable that the nonmagnetic powder contained in the nonmagnetic layer is an acicular nonmagnetic powder having a mean length of the major axis equal to or less than 0.2 $\mu$m.

It is desirable in the magnetic recording medium of the invention that the nonmagnetic layer contains carbon black of an average primary particle size equal to or less than 30 nm and an oil absorption amount equal to or less than 200 ml/100 g, and that the carbon black is contained in a ratio with respect to the nonmagnetic powder in the range of from 5:95 to 30:70.

It is also preferable in the magnetic recording medium of the invention that a binder contained in the nonmagnetic layer has a molecular weight ranging from 20,000 to 50,000 and one or more polar groups selected from groups constituted of —SO$_3$M, —COOM, —OSO$_3$M, —PO(OM)$_2$ and —OPO(OM)$_2$, and the content of the binder in the nonmagnetic layer is 12 to 30 parts with respect to the 100-part-total amount of the nonmagnetic powder and carbon black, and a content of the binder in the nonmagnetic layer is larger than that of the binder in the magnetic layer.

DESCRIPTION OF PREFERRED EMBODIMENTS

In the magnetic recording medium according to the invention, one of features is that the average thickness of the magnetic layer ranges from 0.01 m. to 0.3 $\mu$m, and the average thickness of the nonmagnetic layer is equal to or less than 0.5 $\mu$m.

Required magnetism for recording is secured by making an average value of the thickness of the magnetic layer equal to or more than 0.01 $\mu$m., and resolution property and overwrite can be improved by making the average thickness equal to or less than 0.3 $\mu$m. In particular, the average value of the thickness of the magnetic layer is preferably in the range of from 0.01 to 0.2 $\mu$m, more preferably from 0.01 to 0.1 $\mu$m from the viewpoint that the above characteristics can be attained in a good balance. In addition, not only the effect improving Hc but also the effect improving magnetic-material filling-degree in the magnetic layer can be obtained by making the average thickness of the nonmagnetic layer equal to or less than 0.5 $\mu$m. The average thickness of the nonmagnetic layer is preferably in the range of from 0.2 to 0.5 $\mu$m. from a viewpoint to reflect the smooth surface of the support on the magnetic surface.

It has been well-known to make the average thickness of the nonmagnetic layer 0.5 $\mu$m. or less. However, it is found in the invention that the magnetic-material filling degree in the magnetic layer is enhanced in addition to the Hc improving effect as indicated in the invention disclosed in the Patent Publication (1). This effect can be obtained by making the average thickness of the magnetic layer 0.01 to 0.3 $\mu$m. According to the invention of the Patent Publication (1) where it is disclosed that a thickness of the magnetic layer is 1 $\mu$m. or less and the lower layer thickness is 0.5 $\mu$m., in this invention, however, the magnetic layer is made to be further thinner, in response to the request for high densification. The Hc improving effect and the magnetic-material filling-degree improving effect in the magnetic layer can be obtained by making the nonmagnetic layer thin. Those effects are provided due to decreasing in the magnetic upper layer filling degree by a binder provided from the nonmagnetic layer during application and drying.

As another feature of the magnetic recording medium of the invention, the side of the flexible nonmagnetic support to which the nonmagnetic layer and the magnetic layer formed has a PSD equal to or less than 0.5 $nm^2$ in the wavelength of from 1 to 5 $\mu$m and a PSD of 0.02 to 0.5 $nm^2$ in the wavelength of from 0.5 $\mu$m. or higher to less than 1 $\mu$m. according to a surface roughness spectrum measured with an atomic force microscope, and the flexible nonmagnetic support has a ratio, MD/TD, of Young's modulus in the direction of MD to the direction of TD in the range of from 1/5 to 1/1.

When the surface roughness of the support is measured with an atomic force microscope, the wavelength and strength of the roughness can be obtained. A roughness spectrum indicates changes in strength in the wavelength region of a specified roughness. In the magnetic recording medium of the invention, the surface of the side of the flexible nonmagnetic support to which the nonmagnetic layer and the magnetic layer formed has a PSD equal to or less than 0.5 $nm^2$ in the wavelength of from 1 to 5 $\mu$m. By setting like this, amplitude modulation noises can be reduced. The PSD in the wavelength of from 1 to 5 $\mu$m. is preferably set equal to or less than 0.4 $nm^2$, and more preferably equal to or less than 0.3 $nm^2$, and a PSD in the wavelength of from 0.5 $\mu$m. to 1 $\mu$m. ranges from 0.02 to 0.5 $nm^2$. By setting like this, high output and good running property can be obtained. The PSD in the wavelength of from 0.5 $\mu$m. to 1 $\mu$m. preferably ranges from 0.04 to 0.3 $nm^2$.

The surface geometry of the side of the nonmagnetic support to which the nonmagnetic layer and the magnetic layer are formed can be controlled by changing the particle size and the filling density when making up the support by dispersing particles substantially equal in size into a resin to form a film (a filler is incorporated in the support). Alternatively, it can be controlled by making up a film from a resin containing no or less amount of filler and then forming on the film a layer comprising a binder in which particles of the filler are dispersed.

A C/N ratio (CNR) is remarkably improved by adjusting a ratio, MD/TD, of Young's modulus in the MD direction to the TD direction of the flexible nonmagnetic support in the range of from 1/5 to 1/1. The ratio, MD/TD, is preferably from 1/1 to 1/3. Moreover, the flexible nonmagnetic support preferably has, in the case of a tape, the Young's modulus in the MD direction of 400 to 1500 $kg/mm^2$, preferably 500 to 1300 $kg/mm^2$ and the Young's modulus in the TD direction of 500 to 2000 $kg/mm^2$, preferably 700 to 1800 $kg/mm^2$.

One of the differences in the present invention from the invention described in the Patent Publication (1) is such a point to specify, as mentioned above, a PSD in the specific wavelength of the support to be used according to the roughness spectrum measured with the atomic force microscope (AFM). The invention described in the Patent Publication (1) indicates a preferable Ra range of the support, but the C/N ratio (CNR) improvement, as the object of the present invention, cannot be accomplished only by satisfying this Ra range. Simply making the average roughness small does not always reduce noises since the noise is caused by output fluctuations due to the surface roughness of the specific wavelength during relative movements between the medium and the head. Particularly in the invention, the influence on the support surface becomes remarkable when the thicknesses of the nonmagnetic layer and the magnetic layer become thin.

The second difference is to make the Young's modulus in the TD direction larger than that in the MD direction of the support. It is conventionally known that reinforcing the TD direction of the support renders output higher and edge damages reduced. It was found, however, that the remarkable CNR improving effect was able to be obtained for the thickness of the nonmagnetic layer and the magnetic layer employed in the invention, by combining the control of the roughness of the specific wavelength of the support. When the thicknesses of the nonmagnetic layer and the magnetic layer become thin, the ratio of the support thickness to the overall thickness becomes high. As a result, contacting status at a very small portion of a head changes and thereby the above effect seems to be obtained. In other words, when the ratio of the support thickness becomes high, the inducing amount at the head entrance and exit becomes also larger, thereby lowering contacting pressure at a head-touch center part. When there are undulations of the mentioned wavelength on the support surface, the spacing fluctuations easily occur. In the case that the nonmagnetic layer and the magnetic layer are thick, a cushion effect thereby produced can absorb the spacing fluctuations, but such an effect is reduced when the layers are thin. At this point, the head spacing fluctuations seems to decrease by enhancing the ratio of the Young's modulus in the TD direction of the support. As another viewpoint, it is raised that a surface molding effect by calenders is improved. As a matter of course, the calender molding effect is lowered when the nonmagnetic layer and the magnetic layer become thin. The study of the calender process proved that the molding effect becomes high, as the Young's modulus in the TD direction is made higher. It is so considered that, during calendering, pressure loss is caused since the support itself is compressed and is transformed by temperature and pressure as well as the elongation in the TD direction to which no tension is applied during the process becomes large.

As for the magnetic recording medium of this invention, it can obtain further excellent effects in the following embodiments (I)–(XII).

(I) A nonmagnetic powder contained in the nonmagnetic layer is an acicular nonmagnetic powder having a mean length of the major axis of 0.2 $\mu$m. or lower.

The invention described in Patent Publication (1) indicates experimental results mainly using granulated $TiO_2$, as well as the possibility of the used of the above powder. It was found, however, that according to the invention, the CNR can be remarkably improved by combining the above art to the features of the invention of claim 1. It is because, in comparison with granulated powder, an acicular powder tends to have larger voids before calendering process and the powder is easier to be molded by the calender when applied thinly, thereby making it easier to reflect the surface of the support on the magnetic surface. Also, in the case of the thin layer application, shearing force is stronger than that in the case of thick layer application, and therefore acicular particles are easy to flow and orient in the longitudinal direction, and disorders of the multilayer interfaces are few, thus improving orientation property of the magnetic upper layer as a result. It is effective, especially, when the coating thickness is thin and therefore drying rate is higher.

(II) The nonmagnetic layer has carbon black of an average primary particle size of 30 nm or less and an oil absorption amount of 200 ml/100 g or less, and the carbon black is contained in a ratio with respect to the nonmagnetic powder in the range of from 5:95 to 30:70.

It is suggested by the invention described in the Patent Publication (1) that it is possible to add the carbon black in this range. In the examples, such carbon black is used as having an average primary particle size of 20 m. and an oil absorption amount of 80 ml/100 g in a ratio with respect to the nonmagnetic powder of approximately 5:95. The subsequent researches, however, discovered that higher effects are obtainable with the use of the carbon black prescribed here in the case of the mentioned support and layer structures of the invention. The carbon black functions to improve the calender molding effect, and the effect mentioned in the example of the Patent Publication (1) was not enough. Such carbon black is preferable as being micro particles, but as having a less oil absorption amount and excellent dispersion. In addition, the content of the carbon black is preferably controlled at a suitable level. As for the commercially available carbon black, carbon black for coloring is desirable.

(III) A binder contained in the nonmagnetic layer has a molecular weight ranging from 20,000 to 50,000 and one or more polar groups selected from groups constituted of $-SO_3M$, $-COOM$, $-OSO_3M$, $-PO(OM)_2$ and $-OPO(OM)_2$ (where M indicates a hydrogen atom, an alkali metal ion such as Na or K, or an ammonium ion), and the content of the binder in the nonmagnetic layer is 12 to 30 parts with respect to the 100-part-total amount of the nonmagnetic powder and carbon black, and content of the binder in the nonmagnetic layer is larger than that of the binder in the magnetic layer.

In the invention described in the Patent Publication (1), disclosed are polar groups and an amount of the binder used. In contrast, in addition to those, it is preferable to make the amount of the binder used in the nonmagnetic layer larger than that of the magnetic layer to enhance the effect of the present invention furthermore with following reasons.

It is known that the surface tension of the surface layer becomes higher along with solvent evaporation during production of coating films, thereby producing eddy flows (e.g., Gaisetsu Toryo Bussei Kogaku (Survey of Paint Material Engineering); Kouzou Sato; 1983 (Showa 58); published by Riko Syuppansya). Although a method for adding such materials as lowering the surface tension e.g., silicone is taken in the above literatures, in the case of magnetic recording media, some problems such as deterioration of running durability occur. In this invention, therefore, the binder amount is contrary set to be large for enhancing the surface tension of the nonmagnetic layer. Accordingly, not only good surface property is gained, but also durability of the coating layer can be improved.

The magnetic recording medium of the invention comprises a flexible nonmagnetic support, a nonmagnetic layer containing nonmagnetic powder and a binder formed on the flexible nonmagnetic support, and a magnetic layer containing ferromagnetic powder and a binder formed on the nonmagnetic layer. The materials or the like for making up of the magnetic layer, nonmagnetic layer and flexible nonmagnetic support are sequentially explained as follows.

Magnetic Layer

In the magnetic recording medium of the invention, the object of the invention can be accomplished with either single or multiple magnetic layers. In the case of multiple magnetic layers, an art disclosed in U.S. Pat. No. 5,447,782 can be applied.

However, the thickness fluctuation of the magnetic layer directly becomes noises since using such a thin magnetic layer as mentioned above results in the saturation record. Consequently, it is desirable to have no thickness fluctuation of the magnetic layer. However, it is preferable to make the ratio $\sigma d$. of the standard deviation $\sigma$ in the thickness of the magnetic layer to the thickness d equal to or lower than 0.5 from the viewpoint that noises can be reduced to a certain degree in which the noises are tolerable in practical use. From the viewpoint to reduce noises further, the ratio $\sigma d$. is preferably equal to or lower than 0.3.

Examples of a specific means to decrease $\sigma$. include (1) nonmagnetic layer coating liquid being made to be thixotropic, (2) an acicular nonmagnetic powder being used in a nonmagnetic layer, (3) wet on dry technique being used in which a magnetic layer is coated after coating and drying a nonmagnetic layer, or the else, as described in U.S. Pat. No. 5,496,607. Furthermore, a ratio $\sigma$. equal to or lower than 0.5 can be set by prescribing a binder amount in the nonmagnetic layer and a binder amount in the magnetic layer described later.

In addition, in the magnetic recording medium according to the invention, it is preferably set further that coercive force Hc of the magnetic layer is 1500 Oe or higher to 4000 Oe or less and that residual magnetization per 1 $cm^2$ of the magnetic layer is 0.0005 emu to 0.005 emu. This decreases excess magnetization, and therefore, noises can be further reduced and resolution property can be improved. It is appropriate that the coercive force HC of the magnetic layer is 1500 to 4000 Oe, preferably 1800 to 3500 Oe, and more preferably 2000 to 3000 Oe. The coercive force HC of the magnetic layer can be accordingly changed by adjusting Hc of the ferromagnetic powder contained in the magnetic layer. In addition, the residual magnetization per 1 $cm^2$ of magnetic layer is optimized depending on recording and reproducing methods. There are various methods for setting the amount of residual magnetization to be mentioned ranges. For instance, it is appropriate to set a larger number within the range of the residual magnetization mentioned above when this medium is reproduced with the conventional inductive head. When the magnetic layer is set as to be thinner, e.g., 0.1 $\mu$m. or less from demands for overwrite operation (O/W), an alloy powder having large $\sigma s$., e.g., from 140 emu/g to 160 emu/g is preferably used as the magnetic powder. On the other hand, when reproducing is made with the use of an MR head, it is appropriate to set the smaller amount of the residual magnetization in the mentioned range at the same time with an increase in the number of particles. In this case, it is appropriate to enhance the filling density as much as possible by, for example, decreasing the binder amount in the magnetic layer and nonmagnetic layer with the use of the magnetic powder having $\sigma s$. of 50 to 130 emu/g. As a ferromagnetic powder to be used, an alloy powder having .s of 100 emu/g to 130 emu/g, or hexagonal ferrite having .s of 50 emu/g to 80 emu/g, magnetite, Co-ferrite or the like can be exemplified.

Magnetic Powder

In the magnetic recording medium of the invention, an average thickness d of the magnetic layer is 0.01 .m to 0.3 .m. Therefore, it is preferable to use such a ferromagnetic powder contained in the magnetic layer as those possible to make the average thickness of the magnetic layer in the range mentioned above, and to make the size of magnetic particle small within the range mentioned above and not affected from thermal fluctuation. Practically, in the case of acicular particles, it is appropriate to use particles having a mean length of major axis of 0.05 $\mu$m. to 0.2 $\mu$m. and a diameter of minor axis of 0.01 m. to 0.025 $\mu$m. In addition, it is appropriate to use a hexagonal ferrite having a plate size of from 0.01 $\mu$m. to 0.2 $\mu$m and a thickness of from 0.001 $\mu$m to 0.1 $\mu$m. Other than the ferromagnetic powder mentioned above, a powder of further smaller particles could be used.

As for the magnetic powder contained in the magnetic layer, followings are used such ferromagnetic alloy powder as γ-EeOx (x=1.33 to 1.5), Co modified γ-Feox (x=1.33 to 1.5), or those having Fe, Ni or Co as the main component (75% or higher), and publicly known ferromagnetic powder such as barium ferrite, strontium ferrite or the like. It is more preferable to use ferromagnetic alloy powder having γ-Fe as the main component and the hexagonal ferrite such as barium ferrite.

These ferromagnetic powders may contain atoms, other than the prescribed atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Mn, Zn, Sr, B and so on. Al, Si, Ta, Y or the like can be coated or made a solid solution on the surface to improve the thermal stability. It is publicly known that Co, Sm, Nd or the like is added 5% to 40% by weight to Fe so as to enhance Hc in especial.

Before dispersed, the ferromagnetic powder may be treated with, for example, a dispersant, a lubricant, a surfactant, or an antistatic agent as described later.

Among the above ferromagnetic powder, the ferromagnetic alloy powder may contain a small amount of hydroxides or oxides. The ferromagnetic alloy powders obtained from known manufacturing methods are usable, and the following methods can be mentioned. Those are a method for reduction with composite organic acid salt (oxalate, mainly) and reductive gas such as hydrogen, a method for obtaining Fe or Fe—Co particles or the like by reducing the iron oxide with reductive gas such as hydrogen, a method for thermally decomposing the metal carbonyl compounds, a method for reducing the material by adding reducing agents such as sodium boron hydride, hypophosphite, or hydrazine to ferromagnetic metal solution, and a method for obtaining a powder by evaporating metals in low-pressure inert gas. The ferromagnetic alloy powder thus obtained can be used as those subject to any of the publicly known slow oxidation treatment methods, or a method of dipping the powder in an organic solvent before drying them, a method of dipping the powder in an organic solvent and feeding an oxygen-containing gas to form an oxide film on the surface of powder before drying those powder, and a method of adjusting the partial pressures of an oxygen gas and an inert gas without using an organic solvent, thereby forming an oxide film on the surface of the powder. The last method is the most preferable.

The ferromagnetic powder in the magnetic layer of the invention suitably exhibits a specific surface area, by the BET method, of 25 to 80 $m^2/g$, preferably 40 to 70 $m^2/g$. It is preferable to have the specific surface area of 25 $m^2/g$ or more since noises are reduced and to have the area of 80 $m^2/g$ or less since the surface property is easily obtainable.

The crystallite size of the ferromagnetic powder particles in the magnetic layer of the invention is set as 250 to 100 angstroms, preferably 200 to 100 angstroms. The σs of the iron oxide magnetic powder is 50 emu/g or higher, and preferably 70 emu/g or higher, and the σs of the ferromagnetic metal powder is preferably 100 emu/g or higher. The antimagnetic force is preferably set as 1500 Oe or higher and 4000 Oe or less, more preferably, 2000 Oe or higher and 3000 Oe or less. The acicular ratio of the ferromagnetic powder is 18 or less, preferably, 12 or less.

The moisture content of the ferromagnetic powder is preferably 0.01 to 2% by weight, and the moisture content is preferably optimized depending on the kinds of the binders. The tap density of the γ-iron oxide is preferably 0.5 g/ml or higher, more preferably, 0.8 g/ml or higher. The tap density of the alloy powder is preferably 0.2 to 0.8 g/ml, and if the powder with the tap density of 0.8 g/ml or higher are used, oxidation may be promoted during the compressing process of the ferromagnetic powder, and it may become difficult to obtain an adequate σS. The tap density of 0.2 g/ml or less may cause inadequate dispersions.

The ferromagnetic powder used in the invention preferably has fewer voids whose amount is 20% by volume or less, more preferably 5% by volume or less. A shape of the ferromagnetic powder is preferably any of an acicular, a granule, a rice-shape granule (or spindle-shaped), or a lamella shape as far as it satisfies the aforementioned characteristics related to the particle size. In the case of the acicular or the spindle-shaped ferromagnetic powder, the acicular rate is preferably 12 or less. To achieve the SFD (Switching Field Distribution) of 0.6 or lower in the ferromagnetic powder, the Hc distribution of the ferromagnetic powder is required to be narrower. The methods for narrowing the Hc distribution of the ferromagnetic powder include a method of improving particle size distribution of goethite, a method of preventing γ-hematite from sintering, a method of making the adhering speed of cobalt slower than a conventional method with respect to the cobalt modified iron oxide, or the other methods.

Examples of a plate-shaped hexagonal ferrite used in the present invention include a substituted product such as barium ferrite, strontium ferrite, lead ferrite or calcium ferrite; Co substituted product or the like; and hexagonal Co powder. Specifically the examples include the magnetoplumbate type barium ferrite as well as strontium ferrite, and those magnetoplumbate type barium ferrite as well as strontium ferrite containing partially a spinel phase. Among those, each Co substituted product of barium ferrite or strontium ferrite is particularly preferable. In addition, a ferrite consisting of the above hexagonal ferrite and an element such as Co—Ti, Co—Ti—Zr, Co—Ti—Zn, Ni—Ti—Zn, or Ir—Zn incorporated into the above hexagonal ferrite for controlling antimagnetic force can be used. The hexagonal ferrite is usually hexagon plate-shaped particles, and the diameter of the particles refers to a plate width of the hexagon plate-shaped particles, measured with an electron microscope.

In the present invention, the diameter of the particles is prescribed as in the range of from 0.01 to 0.2 μm, more preferably, in the range of from 0.03 to 0.1 μm. The thickness (plate thickness) of the particles is around 0.001 to 0.1 μm, but preferably, 0.003 to 0.05 μm. The aspect ratio (particle diameter/plate thickness) is 1 to 10, preferably, 3 to 7, and the specific surface area obtained by BET method (SBET) of the hexagonal ferrite powder is preferably 25 to 70 $m^2/g$.

Binders

As for the binder used in the magnetic layer, publicly known binders, for example, disclosed in Japanese Patent No. 2,566,096 and the Japanese Patent No. 2,571,351 can be accordingly used, and especially, vinyl chloride based resins and polyurethane resins are preferred. It is preferable for these binders to have a functional group ($SO_3M$, $PO_3H$ or the like; here, M indicates hydrogen atom or an alkaline metal ion or ammonium ion such as Na or K) promoting absorption with the magnetic powder, and also preferable to have an epoxy group(s). It is adequate to set the molecular weight in the range of from 10,000 to 100,000, and preferably, 20,000 to 60,000. As for the amount to be used, it is adequate to make it 5 to 25 parts by weight, preferably, 5 to 20 parts by weight, and more preferably, 5 to 15 parts by weight with respect to 100 parts by weight of the magnetic powder.

The magnetic layer may contain known abrasives, for example, α-alumina, $Cr_2O_3$ or the like. The average particle size is preferably one third or more to fifth times of the thickness of the magnetic layer in the case of wet on wet coating, and one third or more to twice of the thickness of the magnetic layer in the case of wet on dry coating; excessively large size particles may cause thermal asperity. The micro particles are preferred because the abrasives tend to form projections especially in the wet on dry coating. The known art can be suitably used for the pH adjustment and the surface treatment.

Other than the mentioned above, solid lubricants (carbon having a particle size of 30 m. or larger) or liquid lubricants such as fatty acid or fatty acid ester can be accordingly added to the magnetic layer.

Nonmagnetic Layer

With respect to the nonmagnetic powder used in the nonmagnetic layer, the known nonmagnetic powder can be used, and its shape can be any of acicular, sphere, polygon, and plate. For example, the nonmagnetic powder used as examples in Japanese Patent No. 2,571,351 and U.S. Pat. No. 5,496,607 can be suitably used. As mentioned above, however, a nonmagnetic powder used in the nonmagnetic layer is preferably an acicular nonmagnetic powder having a mean length of major axis of 0.2 $\mu$m or less, more preferably 0.15 $\mu$m or less, and further preferably, 0.1 .m or less. In addition, the acicular ratio is 2 to 20, and preferably 3 to 10. In particular, an acicular metal oxide having pH of 5 or higher is especially preferable in the present invention. Those are highly absorptive to functional groups, thus providing good dispersion even with the binder of a smaller and have high mechanical strength for coated films. In addition, it is characterized in that thixotropy property of a coating liquid required by the invention is easily obtained due to the shape effect. The particles might have the size described in the mentioned publication, but smaller is more preferable.

As other favorable embodiments of the nonmagnetic powder, it is adequate to have an oil absorption amount, using DIP, of 5 to 100 ml/100 g, preferably, 10 to 80 ml/100 g, and more preferably, 20 to 60 ml/100 g, and the specific gravity of 1 to 12, preferably, 3 to 6. The ignition loss is preferably 20% by weight or less.

The inorganic powder as the nonmagnetic powder used in the present invention preferably has hardness of 4 or higher on the Mohs' scale. The roughness factor of the powder surface is preferably 0.8 to 1.5, and more preferably, 0.9 to 1.2. It is adequate to set an absorption amount of stearic acid (SA) in the range of from 1 to 20 $\mu$mol/m$^2$, preferably, 2 to 15 $\mu$mol/m$^2$. The wetting heat to water at 25° C. in the nonmagnetic powder of the nonmagnetic layer is preferably in the range of from 200 erg/cm$^2$ to 600 erg/cm$^2$, and a solvent having a wetting heat in this range can be used. Water molecule amount at a surface at 100 to 400° C. is adequately 1 to 10 piece/100 angstroms.

The pH at the isoelectric point in water is preferably between 5 and 10.

The surface of each powder is preferably surface-treated so that at least a part of the surface is covered with $Al_2O_3$, $SiO_2$, $TiO_2$, $ZrO_2$, $SnO_2$, $Sb_2O_3$, or ZnO. Especially, in respect of dispersing property, preferable are $Al_2O_3$, $SiO_2$, $TiO_2$, $ZrO_2$. The surface treatment may be made with two or more combined compounds from above. Moreover, a surface-treated layer coprecipitated according to the object is usable, and the particles may have a structure designed to be surface-coated with silica on an alumina coating or a structure in reverse of this structure. The surface-treated layer may be a porous layer according to the object, but such a layer is generally preferable as being homogeneous and dense.

The nonmagnetic layer may be mixed with magnetic materials, for example, for providing thixotropic property or the like. On this occasion, if magnetization comes to contribute to the recording and reproducing, a thick layer is substantially created, thereby reducing thin layer effects. The magnetic material having a fully high Hc (80% or higher of the upper layer Hc) and being hard to be magnetized can be added as long as the magnetic material is 30% by volume by percent or lower.

The binder to be used may be the same as that of the magnetic layer, but such a binder containing the functional group (mentioned above) that improves dispersing property is preferable. Furthermore, it is desirable that the molecular weight is 20,000 to 50,000, more preferably, 30,000 to 50,000 from the viewpoint that a proper calender molding effect is easy to be obtained. As described in Japanese Patent No. 2,566,088 and Japanese Patent No. 2,634,792, it is more effective to surface-treat the inorganic powder with an aromatic phosphorus compound for promoting dispersion.

The binder weight B(L) in the nonmagnetic layer is in the range of from 12 parts or more to 30 parts or less, preferably, 15 parts to 25 parts with respect to the 100-parts by weight-total amount of the nonmagnetic powder, as a main component, and carbon black, and it is preferable that the binder weight is higher than those in the magnetic layer.

It is preferable to add such carbon black to the nonmagnetic layer as having an average primary-particle diameter of 30 nm or lower, preferably, 20 nm or lower and having an oil absorption amount of 200 ml/100 g or lower, preferably 100 ml/100 g or lower. As for the amount of the carbon black added, it is adequate to be in a ratio of 10:90 to 30:70 of the carbon black to the main powder.

In addition, publicly known lubricants may be added.

It is preferable to cross-link or cure a binder composed of the magnetic layer and the nonmagnetic layer of the magnetic recording medium of the invention by using the following polyisocyanates as one component of the binder.

Followings are usable as the polyisocyanates such as: isocyanates such as tolylene diisocyanate, 4-4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; products of these isocyanates with polyalcohols; and polyisocyanates formed through condensation of isocyanates. These isocyanates are commercially available under the following trade names: Coronate L, Coronate HL, Coronate 2030, Coronate 2031, Millionate MR, and Millionate MTL manufactured by Nippon polyurethane Co. Ltd.; Takenate D-102, Takenate D-110N, Takenate D-200, and Takenate D-202 manufactured by Takeda Chemical Industries, Ltd.; and Desmodule L, Desmodule IL, Desmodule N, and Desmodule HL manufactured by Sumitomo Bayer Co. Ltd. For both the nonmagnetic layer and the magnetic layer, these polyisocyanates may be used alone, or used in combination of two or more by taking advantage of a difference in curing reactivity.

In the magnetic layer and the nonmagnetic layer of the magnetic recording medium of the invention, carbon black can be used. The examples of the carbon black include furnace black for rubbers, thermal for rubbers, black for coloring, acetylene black and the like. The preferable carbon black contained in the nonmagnetic layer is mentioned above. The carbon black contained in the magnetic layer preferably has a specific surface area of from 5 to 500 m$^2$/g, a DBP absorption of from 10 to 400 ml/100 g, a particle diameter of 5 to 300 mμ, a pH of 2 to 10, a moisture content of 0.1 to 10% by weight, and a tap density of 0.1 to 1 g/ml.

Specific examples of carbon black for use in this invention include BLACKPEARLS 2000, 1300, 1000, 900, 800, 700, and VULCAN XC-72 manufactured by Cabot Corporation, #80, #60, #55, #50, and #35 manufactured by Asahi Carbon Co. Ltd., #2400B, #2300, #900, #1000, #30, #40, and #10B manufactured by Mitsubishi Chemical Corp., and CONDUCTEX SC, RAVEN 150, 50, 40, and 15 manufactured by manufactured by Columbia Carbon Co. These carbon black may be used after surface-treated with a dispersant or another agent or grafted with a resin, and carbon black whose surface has been partly graphitized may be used. Further, before added to a magnetic coating liquid, the carbon black may be dispersed in advance into the binder. These carbon black can be used alone or in combination.

The carbon black is preferably used in an amount of 0.1 to 30% by weight with respect to the amount of ferromagnetic powder.

The carbon black has functions in the magnetic layer to prevent static buildup, to reduce the coefficient of friction, to provide light-transmittance, or to improve strength for coating. These effects are different depending on kinds of carbon black. Therefore it is, as a matter of course, possible in the present invention to properly use carbon black different in kinds, amount and combination, in view of the purposes, in the magnetic layer and nonmagnetic layer depending on the mentioned properties such as particle size, oil absorption amount, electrical conductivity or pH. As for the examples of the carbon black usable in the invention, Carbon Black Binran (Carbon Black Handbook) edited by Carbon Black Association, for example, can be referred.

Abrasives can be idded to the magnetic layer of the magnetic recording medium of the invention. As the abrasives, known materials mostly having 6 or higher on Mohs' scale of hardness can be used alone or in combination; for example, α-alumina having an α-conversion rate of 90% or higher, β-alumina, silicon carbide, chromium oxide, cerium oxide, α-iron oxide, corundum, artificial diamond, silicon nitride, titanium carbide, titanium oxide, silicon dioxide, and boron nitride. A composite composed of two or more of these abrasives (e.g., one obtained by surface-treating one abrasive with another) may also be used. Although these abrasives contain compounds or elements other than the main component in some cases, it is adequate for the abrasive to have the main component of 90% by weight or higher. The abrasive preferably has a tap density of 0.3 to 2 g/ml, a moisture content of 0.1 to 5% by weight, a pH of 2 to 11, and a specific surface area of 1 to 30 $m^2/g$. Although abrasives used in the present invention may have any of an acicular, spherical, or cubical shape, particles having corners on the part of the shape is preferred due to its good abrasive property. Specific examples of the abrasive used in the invention are AKP-20, AKP-30, AKP-50, HIT-50, HIT-55, HIT60A, HIT-70 and HIT-100 manufactured by Sumitomo Chemical Co. Ltd., G5, G7 and S-1 manufactured by Nippon Chemical Industrial Co. Ltd., and TF-100 and TF-140 made by Toda Kogyo Corp. It is, as a matter of course, possible in the present invention to properly use abrasives different in kinds, amount and combination, in view of the purposes, in the magnetic layer and nonmagnetic layer. These abrasives may be added into the magnetic paints after dispersing treatment in advance with the binder.

Those having a lubricating effect, an antistatic effect, a dispersing effect, a plasticizing effect or the like can be used as additives in the invention. Examples of such additives include molybdenum disulfide, tungsten graphite disulfide, boron nitride, graphite fluoride, silicone oil, silicones having a polar group or groups, fatty acid modified silicones, fluorine-containing silicones, fluorine-containing alcohols, fluorine-containing esters, polyolefins, polyglycols, alkyl phosphoric esters and their alkali metal salts, alkyl sulfuric esters and their alkali metal salts, polyphenyl ethers, fluorine-containing alkyl sulfuric esters and their alkali metal salts, monobasic fatty acid having a carbon number of 10 to 24 (possible to contain an unsaturated bond or bonds, or to be branched) and their metal salts (e.g., Li, Na, K, Cu), or monohydric, dihydric, trihydric, tetrahydric, pentahydric, and hexahydric alcohols having a carbon number of 12 to 22 (possible to contain an unsaturated bond or bonds, or to be branched), alkoxyalcohols having a carbon number of 12 to 22, monofatty acid esters, difatty acid esters or trifatty acid esters comprising any one of monobasic fatty acid having a carbon number of 10 to 24 (possible to contain an unsaturated bond or bonds, or to be branched) and monohydric, dihydric, trihydric, tetrahydric, pentahydric, and hexahydric alcohols having a carbon number of 2 to 12 (possible to contain an unsaturated bond or bonds, or to be branched), fatty acid esters of monoalkyl ethers of alkylene oxide polymerized products, fatty acid amides having a carbon number of 8 to 22, aliphatic amines having a carbon number of 8 to 22, and so on.

Concrete examples of such additives include lauric acid, myristic acid, palmitic acid, stearic acid, behenic acid, butyl stearate, oleic acid, linolic acid, linolenic acid, elaidic acid, octyl stearate, amyl stearate, iso-octyl stearate, octyl myristate, butoxyethyl stearate, anhydrosorbitan monostearate, anhydrosorbitan distearate, anhydrosorbitan tristearate, oleyl alcohol, and lauryl alcohol. Also, those can be used such as nonionic surfactants such as alkylene oxide system, glycerin system, glycidol system, or alkylphenol-ethylene oxide adducts; cationic system surfactants such as cyclic amines, ester amides, quaternary ammonium salts, hydantoin derivatives, heterocyclic compounds, phosphoniums or sulfoniums; anionic surfactants containing an acidic group such as carboxylic acid, sulfonic acid, phosphoric acid, sulfuric ester group, or phosphoric ester group; and ampholytic surfactants such as amino acids, aminosulfonic acids, sulfuric or phosphoric esters of aminoalcohols, or alkylbetaine type.

These surfactants are described in detail in "A Guide to Surfactants" (published by Sangyo Tosho Co.). These lubricants, antistatic agents or the like need not be 100% pure, but may contain impure components such as isomers, unreacted substances, side reaction products, degradation products or oxides in addition to the main component. The content of these impurities is preferably 30% or less, and more preferably 10% or less.

These lubricants and surfactants usable in this invention may be different in kinds and amounts between in the magnetic layer and in the nonmagnetic layer according to the purpose. For example, it is conceivable to control bleeding on the surface with use of fatty acids having different melting temperatures between the nonmagnetic layer and the magnetic layer, to control bleeding on the surface with use of esters having different boiling points and polarities, to improve the coating stability by adjusting the surfactant amount, and to improve lubricant effects by increasing the additive amount of lubricants in the nonmagnetic layer, and such designing is not limited to the above examples as a matter of course. Also, all or some of the additives used in the invention may be added at any stage of the manufacturing process for the magnetic paint; for example, they may be mixed with the ferromagnetic powder before a kneading step, added at a kneading step for kneading the ferromagnetic powder, the binder, and a solvent, added at a dispersing step, added after dispersing, or added immediately before coating. The object may be accomplished by coating a part or all of the additives by simultaneous or sequential coating, after the magnetic layer is coated according to the purpose. The lubricants may be coated on the surface of the magnetic layer after calendar processing or making slits depending on the purpose.

Product examples of the lubricants used in the invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid manufactured by NOF Corp.; oleic acid manufactured by Kanto chemical Co. Ltd.; FAL-205 and FAL-123 manufactured by Takemoto Oil and Fat Co. Ltd.; NJLUB LO, NJLUB IPM, and sansosyzer E4030 manufactured by New Japan Chemical Co. Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935 manufactured by Shin-Etsu Chemical Co. Ltd.; Armaid P, Armaid C, and Armoslip CP manufactured by Lion Armour Co.; Duomine TDO manufactured by Lion Corp.; BA-41G manufactured by The Nisshin Oil Mills, Ltd.; Profan 2012E, Newpole PE61,Ionet MS-400, Ionet MO-200Ionet DL-200, Ionet DS-300, and Ionet DS-1000, or Ionet DO-200 manufactured by Sanyo Chemical Industries, Ltd.

As the organic solvents used in the invention, those can be used at the optional ratio, such as ketones such as acetone, methyl ethyl ketone, methyl isobutyl ketone, diisobutyl ketone, cyclohexanone,. isophorone, or tetrahydrofuran; alcohols such as methanol, ethanol, propanol, butanol, isobutyl alcohol, isopropyl alcohol, or methylcyclohexanol; ethers such as methyl acetate, butyl acetate, isobutyl acetate, isopropyl acetate, ethyl lactate or glycol acetate; glycol ether systems such as glycol dimethyl ether, glycol monoethyl ether, or dioxane; aromatic hydrocarbon such as benzene, toluene, xylene, cresol or chlorobenzene; chlorinated hydrocarbon such as methylene chloride, ethylene chloride, carbon tetrachloride, chloroform, ethylene chlorohydrin, or dichlorobenzene; N,N-dimethylformamide; hexane or the like. These organic solvents need not be 100% pure, but may contain impure components, such as isomers, unreacted substances, side reaction products, degradation products, oxides or moisture, in addition to the main component. The content of those impurities is preferably 30% or less, and more preferably 10% or less. In the invention, the same kinds of organic solvents are desirably used in the magnetic layer and the nonmagnetic layer, and then those adding amounts can be changed. It is adequate to raise the stability of coating, in the nonmagnetic layer, using a solvent having a high surface tension, (e.g., cyclohexane, dioxane or the like), for forming the nonmagnetic layer, more specifically, to design that the arithmetic mean value of the magnetic layer solvent compositions is not less than the arithmetic mean value of the nonmagnetic layer solvent compositions. To improve the dispersing property, a solvent having a strong polarity to some extent is preferred, and it is also preferable that the solvent having permittivity of 15 or more is contained 50% or higher in the solvent compositions. The dissolution parameter is preferably 8 to 11.

Flexible Nonmagnetic Support

As the flexible nonmagnetic support used in the invention, followings can be used such as publicly known films of polyesters such as polyethylene terephthalate or polyethylene naphthalate, polyolefins, cellulose triacetate, polycarbonate, polyamide, polyimide, polyamideimide, polysulfone, aramid, and aromatic polyamide. These supports may be subjected beforehand to corona discharge treatment, plasma treatment, treatment for enhancing adhesion, heat treatment, dust removal or the like.

As mentioned above, such a flexible nonmagnetic support is used in this invention as having a PSD equal to or less than $0.5$ nm$^2$ in the wavelength of from 1 to 5 $\mu$m and a PSD in the range of from 0.02 to 0.5 nm$^2$ in the wavelength of from 0.5 $\mu$m or higher to less than 1 $\mu$m according to the surface roughness spectrum measured with AFM. The configuration of the surface roughness can be freely controlled by the size and the amount of the fillers added to the support. Examples of such fillers include oxides or carbonates of Ca, Si and Ti, as well as organic powder of acrylic resins or the like.

As for the nonmagnetic support used in this invention, the thermal shrinkage of the support in the tape running direction and in the tape width direction at 100° C. for 30 minutes is preferably 3% or less, more preferably 1.5% or less, and the thermal shrinkage at 80° C. for 30 minutes is preferably 1% or less, more preferably 0.5% or less. It is preferable that the break strength of the support in the both directions is preferably 5 to 100 kg/mm$^2$ and that the modulus of elasticity is 100 to 2,000 kg/mm$^2$.

As for the thickness structure of the magnetic recording medium of the invention, it is appropriate to set that the flexible nonmagnetic support is, e.g., 1 to 100 $\mu$m, preferably, 4 to 80 $\mu$m. The total thickness in combination of the magnetic layer and the nonmagnetic layer is properly set in the range of from one hundredth to twice of the flexible nonmagnetic support. In addition, an undercoat layer may be provided in order to improve adhesion between the flexible nonmagnetic support and the nonmagnetic layer. The thickness of the undercoat layer is, for example, 0.01 to 2 $\mu$m, preferably 0.02 to 1.5 $\mu$m. On the side of the nonmagnetic support opposite to the magnetic layer side, a back coating layer may be provided. The thickness of the back coating layer is adequately, for example, in the range of from 0.1 to 2 $\mu$m, preferably 0. 3 to 1.0 $\mu$m. The components for use in the undercoat layer and the back coating layer may be publicly known ones.

The magnetic recording medium of the invention can be manufactured by coating a paint for nonmagnetic layer and a paint for the magnetic layer.

The process for producing the paints for the nonmagnetic layer and the magnetic layer includes steps comprising at least of a kneading step and a dispersing step, and if necessary, a mixing step to be carried out before or after these steps. The individual step may be performed separately at two or more stages. All of the starting materials to be used in the invention, including the ferromagnetic powder, binders, carbon black, abrasives, antistatic agents, lubricants, solvents and so on, may be added at the beginning of or during any of the steps. Furthermore, the individual material may be divided and added in two or more steps; for example, a polyurethane may be divided and added in the kneading step, the dispersing step, and the mixing step for viscosity adjustment after dispersing.

Although in the manufacturing process, conventional publicly known manufacturing techniques can be used as a part of the process to achieve the object of the invention as a matter of course, a continuous kneader or a pressure kneader having a strong kneading force can be used in the kneading step. With the use of these kneaders, a magnetic recording medium having a high residual magnetic flux density (Br) can be obtained. When the continuous kneader or pressure kneader is used, the ferromagnetic powder and all or part of the binder (preferably, 30% or higher of the entire binder) are kneaded in the range of from 15 to 500 parts by weight with respect to the 100 parts by weight of the ferromagnetic powder. Details of the kneading treatment are set forth in U.S. Pat. Nos. 4,946,615 and 5,300,244. When a nonmagnetic layer liquid is prepared, dispersing media having a high specific gravity may preferably be used, desirably, zirconia beads.

The followings can be applied as coating apparatuses and methods for producing multilayer magnetic recording media such as that of the present invention.

1. A nonmagnetic layer is first applied with a coating apparatus commonly used for magnetic paint coating, e.g., a gravure coating, roller coating, blade coating, or extrusion coating apparatus, and a magnetic layer is then applied, while the nonmagnetic layer is still in a wet state, by means of a support-pressing extrusion coating apparatus such as those disclosed in U.S. Pat. Nos. 4,480,583; 4,681,062; and 5,302,206.

2. An upper nonmagnetic layer is applied almost simultaneously using a single coating head having two built-in slits for passing coating liquid, such as those disclosed in U.S. Pat. Nos. 4,854,262; 5,072,688; and 5,302,206.

3. An upper nonmagnetic layer is applied almost simultaneously using an extrusion coating apparatus with a backup roller as disclosed in Japanese Unexamined Patent Publication (KOKAI) Heisei No.2-174,965.

In order to prevent lowering the electromagnetic characteristics or the like of the magnetic recording medium by aggregation of ferromagnetic particles, shearing may preferably apply to the coating liquid in the coating head by a method such as those disclosed in U.S. Pat. No. 4,828,779 and Japanese Unexamined Patent Publication (KOKAI) Heisei No.1-236,968. In addition, the viscosity of the coating liquid needs to satisfy the numerical range as specified in U.S. Pat. No. 4,994,306. To obtain the magnetic recording medium of the invention, a strong orientation is required to be made. It is preferable to concurrently use a solenoid of 1000 G or higher and a cobalt magnet of 2000 G or higher in a manner that the same polarities of those above oppose to each other, and furthermore, it is preferable to set a proper drying step in advance before the orientation so that the post-dry orientation characteristics show the highest. When this invention applies to a disc medium, an orientation method rather to randomize the orientation is required. To change the orientation direction of the magnetic layer and nonmagnetic layer, the orientation direction is not necessary to be in an in-plane, longitudinal direction, but it can be in a vertical or widthwise direction.

Heat-resistant plastic rollers, e.g., epoxy, polyimide, polyamide, or polyimideamide, can be used as rollers for calendering process, or metal rollers by themselves can also be used. The processing temperature is preferably at 70° C. or higher, more preferably at 80° C. or higher. The linear pressure is preferably 200 kg/cm or higher, more preferably 300 kg/cm or higher. The coefficient of friction of the surface of the magnetic layer s and the opposite surface of the magnetic layer of the magnetic recording medium of the invention is preferably 0.5 or less, more preferably 0.3 or less with respect to SUS420J, the surface resistivity of those is preferably from $10^4$ to $10^{12}$ ohm/sq, the modulus of elasticity at 0.5% elongation of the magnetic layer is preferably from 100 to 2,000 kg/mm$^2$ in both the running and width directions, the strength at break is preferably from 1 to 30 kg/cm$^2$, the modulus of the magnetic recording medium is preferably from 100 to 1,500 kg/mm$^2$ in both running and longitudinal directions, the residual elongation is preferably 0.5% or less, and the thermal shrinkage at any temperature of 100° C. or below is preferably 1% or less, more preferably 0.5% or less, and the most preferably 0.1% or less. The glass transition temperature (the temperature at which the loss elastic modulus in a dynamic viscoelasticity measurement at 110 Hz becomes maximum) of the magnetic layer is preferably 50° C. or higher to 120 C. or below, while that of the nonmagnetic layer is preferably at 0° C. to 100 C. The loss elastic modulus is preferably in the range of from $1.10^8$ to $8.10^9$ dyne/cm$^2$ and the loss tangent is preferably 0.2 or less.

The residual solvent contained in the magnetic layer is preferably 100 mg/m$^2$ or less, more preferably 10 mg/m$^2$ or less, and the residual solvent contained in the second layer is preferably lower than that in the first layer. The void percentage in the magnetic layer is preferably 30% by volume or less and more preferably 20% by volume or less in the both nonmagnetic and magnetic layers. Although a lower void percentage is preferable for attaining higher output, there are some cases in which a certain degree of void percentage is preferably ensured according to the purposes; for example, in the case of a magnetic recording medium for data recording putting an importance on the repeating use, higher void percentage in most cases bring about better running durability. The magnetic property of the magnetic recording medium of the invention has, when measured in a magnetic field of 5 KOe, the squareness of 0.70 or higher, preferably, 0.80 or higher, more preferably, 0.90 or higher in the tape running direction.

The squareness in two directions perpendicular to the tape running direction is preferably 80% or less of the squareness in the running direction. The SFD (Switching Field Distribution) of the magnetic layer is preferably 0.6 or less.

With the magnetic recording medium of the invention, which has the nonmagnetic layer and magnetic layer, it is easily presumed that the nonmagnetic layers and the magnetic layers can change the physical properties according to the purposes. For example, the magnetic layer is made to have a high elastic modulus to improve running durability while the nonmagnetic layer is made to have a lower elastic modulus than that of the magnetic layer to have better head touching of the magnetic recording medium. Techniques relating to known multilayer magnetic layers can be refer to when designing physical characteristics of two or more magnetic layers. For example, although there are many inventions as disclosed in Japanese Patent Publication (KOKOKU) Showa No. 37-2,218 and Japanese Unexamined Patent Publication (KOKAI) Showa No. 58-56,228 in which the Hc of the magnetic layer is set higher than that of the nonmagnetic layer, recording is possible for the magnetic layer having further higher Hc by making the magnetic layer thinner as described in the invention.

EXAMPLES

The present invention is explained below in detail by the following examples. The indication of "parts" means "parts by weight" in those examples.

| (1) Nonmagnetic Layer | |
|---|---|
| Nonmagnetic Powder -Fe$_2$O$_3$ | 80 parts |
| Mean length of major axis: 0.1 m | |
| BET specific surface area: 48 m$^2$/g | |
| pH 8, Fe$_2$O$_3$ content: 90% or higher | |
| DBP oil absorption amount: 27–38 ml/100 g | |
| Surface Covering Compound: Al$_2$O$_3$ | |
| Carbon black | 20 parts |
| Average primary-particle diameter: 16 m$\mu$ | |
| DBP oil absorption amount: 80 ml/100 g | |
| pH: 8.0 | |
| BET specific surface area: 250 m$^2$/g | |
| Volatile content: 1.5% | |
| Vinyl chloride copolymer | 7 parts |
| MR-110 manufactured by Nippon Zeon, Co. Ltd | |
| Polyester polyurethane resin | 5 parts |
| Neopentyl glycol/Caprolactonepolyol/MDI | |
| (Diphenylmethane-4,4'-diisocyanate) = 0.9/2.6/1 | |
| Containing 1 × 10$^{-3}$ eq/g - SO$_3$ Na group | |
| Butyl stearate | 1 part |
| Stearic acid | 1 part |
| Methyl ethyl ketone | 100 parts |
| Cyclohexanone | 50 parts |
| Toluene | 50 parts |
| (2) Magnetic Layer | |
| Ferromagnetic metal powder | 100 parts |
| Composition: Fe/Co stoic ratio = 80/20 | |
| Hc 2300 Oe, | |
| BET specific surface area 54 m$^2$/g | |
| Crystallite size 165 angstroms | |
| Surface Covering Compound: Al$_2$O$_3$ | |
| Particle size (major axis size) 0.1 $\mu$m | |
| Acicular ratio 8 | |
| $\sigma$s: 150 emu/g | |
| Vinyl chloride based copolymer | 5 parts |
| MR-110 manufactured by Nippon Zeon, Co. Ltd | |
| Polyester polyurethane resin | 3 parts |
| Neopentyl glycol/Caprolactonepolyol/MDI | |
| (Diphenylmethane-4,4'-diisocyanate) = 0.9/2.6/1 | |
| Containing 1 × 10$^{-4}$ eq/g - SO$_3$ Na group | |
| Alumina (particle size, 0.1 $\mu$m) | 5 parts |
| Carbon black (particle size, 0.10 $\mu$m) | 0.5 part |
| Butyl stearate | 1.5 part |
| Stearic acid | 0.5 part |
| Methyl ethyl ketone | 90 parts |
| Cyclohexanone | 30 parts |
| Toluene | 60 parts |

The above two paints were dispersed respectively using a sand mill after each component was kneaded in a continuous kneader. Polyisocyanate was added to the obtained dispersing liquids; three parts were added to the coating liquid for the nonmagnetic layer, and one part was added to the coating liquid for the magnetic layer. A mixed solvent of methyl ethyl ketone and cyclohexanone was added by 40 parts to each liquid, and each liquid was filtered using a filter having a mean pore diameter of 1 $\mu$m to prepare respective coating liquids for forming the magnetic layer and nonmagnetic layer. On a polyethylenenaphthalate support having the thickness of 5.5 $\mu$m, a PSD of 0.05, 0.09 and 0.11 nm$^2$ in the wavelength of from 0.5, 1, and 5 $\mu$m respectively according to the roughness spectrum with AFM, and Young's modulus of 600 kg/m$^3$ and 900 kg/m$^3$ in MD and TD directions respectively, the obtained coating liquid for the nonmagnetic layer was coated in such an amount as to form the dry thickness of 0.3 $\mu$m, and immediately after this, the coating liquid for the magnetic layer was coated on the nonmagnetic layer in such an amount as to form the thickness of 0.1 $\mu$m. These layers were coated by a simultaneous multilayer coating method. While both layers were still in a wet state, the layers were subject to orientation created by a Co—Sm magnet having a 3,000 G magnetic force and a solenoid having a 1500 G magnetic force. After dried, the layers were calendered at temperature of 90° C. by passing through six nips, each of which comprising a pair of metal rollers to manufacture a magnetic tape, and then slitting it into an 8 mm width, thereby producing an 8mm videotape.

(1) C/N Ratio

C/N ratio was measured in use of the drum tester. The head used was an MIG head having the Bs of 1.2 T, a gap length of 0.22 $\mu$m for recording and reproducing uses. The relative velocity of head to medium during recording and reproducing was 10.5 m/sec and a single frequency signal of 21 MHz was recorded, and reproducing spectrum was observed with a spectrum analyzer manufactured by Shibasoku Co.,Ltd. The C/N was the ratio of the carrier output of 21 MHz to the noise of 19 MHz.

(2) Measurement of Thickness

A sampling tape was cut out in the longitudinal direction with a diamond cutter to form the thickness of about 0.1 $\mu$m, and it was observed and taken pictures by a transmission electron microscope having magnification of 100,000 times. Lines were drawn on the magnetic layer surface and the interface of magnetic layer and nonmagnetic layer, and then, measurement was made by the image processor IBAS2 manufactured by Zeiss Co. When the measured length was 21 cm, measurements were made 85 to 300 times, thus calculating a mean value d and a standard deviation $\sigma$.

(3) AFM Measurement

A ridge degree measured 70 degree with NanoScope 3 manufactured by Digital Instruments, and a square angle measured 30 $\mu$m with the quadrangular pyramid probe manufactured amade of SiN. Surface roughness was analyzed with frequency to produce a power spectrum (4) Coefficient of Friction The tape was lapped at a 90 degree angle with a stick of SUS 303 having a roughness of 0.2 S and 2 mm, and it was subjected to passing-sweeping movement of 100 passes with a load of 10 g and velocity of 18 mm/sec stroke 10 mm, measuring the maximum coefficient of friction. The measurement was made under temperature at 21° C. and humidity of 50%.

TABLE 1

| | | Ex. 1 | Ex. 2 | Ex. 3 | Ex. 4 | Ex. 5 | Ex. 6 |
|---|---|---|---|---|---|---|---|
| Thickness | | | | | | | |
| NML | [$\mu$m] | 0.1 | 0.03 | 0.27 | 0.1 | 0.1 | 0.1 |
| ML | [$\mu$m] | 0.3 | 0.2 | 0.45 | 0.3 | 0.3 | 0.3 |
| Base | | | | | | | |
| PSD [nm$^2$] | 0.5 $\mu$m | 0.5 | 0.05 | 0.15 | 0.03 | 0.03 | 0.03 |
| | 1.0 $\mu$m | 1.0 | 0.09 | 0.28 | 0.07 | 0.07 | 0.07 |
| | 5.0 $\mu$m | 5.0 | 0.12 | 0.35 | 0.15 | 0.15 | 0.15 |
| TD-YM | [kg/m$^3$] | 600 | 600 | 600 | 800 | 700 | 600 |

TABLE 1-continued

|  |  | Ex. 1 | Ex. 2 | Ex. 3 | Ex. 4 | Ex. 5 | Ex. 6 |
|---|---|---|---|---|---|---|---|
| MD-YM | [kg/m³] | 900 | 900 | 900 | 1800 | 800 | 900 |
| TD/MD |  | 1.5 | 1.5 | 1.5 | 2.25 | 1.14 | 1.5 |
| Powder in NML |  |  |  |  |  |  |  |
| Kinds |  | AH | AH | AH | AH | AH | AH |
| Major axis length Carbon in NML | [μm] | 0.1 | 0.1 | 0.1 | 0.05 | 0.18 | 0.1 |
| Average particle size | [nm] | 16 | 16 | 16 | 16 | 16 | 16 |
| Oil Absorption amount | [ml/100 g] | 80 | 80 | 80 | 80 | 80 | 80 |
| Content Containing ratio Binder amount | Parts | 20 20:80 | 20 20:80 | 20 20:80 | 20 5:95 | 20 25:75 | 20 20:80 |
| ML [Parts/magnetic | VC | 5 | 5 | 5 | 5 | 5 | 12 |
|  | UR | 3 | 3 | 3 | 3 | 3 | 5 |
|  | HA | 1 | 1 | 1 | 1 | 1 | 5 |
| netic powder | Totals | 9 | 9 | 9 | 9 | 9 | 22 |
| NML [parts/main | VC | 10 | 10 | 10 | 10 | 10 | 12 |
|  | UR | 5 | 5 | 5 | 5 | 5 | 8 |
|  | HA | 3 | 3 | 3 | 3 | 3 | 5 |
| powder + carbon] | Totals | 18 | 18 | 18 | 18 | 18 | 25 |
| B(U)/B(L) Evaluations and Results |  | 0.5 | 0.5 | 0.5 | 0.5 | 0.5 | 0.88 |
| Reproduction output | [dB] | 3.7 | 0.6 | 3.5 | 4.3 | 3 | 2.5 |
| CNR | [dB] | 5.1 | 3.2 | 4.8 | 5.2 | 3.5 | 3 |
| Frictional coefficient |  | 0.22 | 0.25 | 0.29 | 0.3 | 0.25 | 0.22 |

NML: Nonmagnetic Layer
ML: Magnetic Layer
YM: Young modulus
AH: Acicular hematite
VC: Vinyl chloride
UR: Urethane
HA: Hardening agent

TABLE 2

|  |  | Comp. Ex. 1 | Comp. Ex. 2 | Comp. Ex. 3 | Comp. Ex. 4 |
|---|---|---|---|---|---|
| Thickness |  |  |  |  |  |
| NML | [μm] | 0.5 | 0.1 | 0.1 | 0.1 |
| ML | [μm] | 0.3 | 0.3 | 0.3 | 0.3 |
| Base |  |  |  |  |  |
| PSD | 0.5 μm | 0.3 | 0.3 | 0.3 | 0.01 |
| [nm²] | 1.0 μm | 0.9 | 0.9 | 0.9 | 0.01 |
|  | 5.0 μm | 2.5 | 2.5 | 2.5 | 0.06 |
| TD-YM | [kg/m³] | 700 | 700 | 700 | 700 |
| MD-YM | [kg/m³] | 600 | 600 | 600 | 600 |
| TD/MD |  | 0.86 | 0.86 | 0.86 | 0.86 |
| Powder in NML |  |  |  |  |  |
| Kinds |  | Granulated TiO₂ | AH | AH | AH |
| Major axis length Carbon in NML | [μm] | 0.04 | 0.1 | 0.1 | 0.1 |
| Average particle size | [nm] | 20 | 20 | 16 | 16 |
| Oil Absorption amount | [ml/100 g] | 250 | 250 | 80 | 80 |
| Content Containing ratio Binder amount | Parts | 4.8 5:95 | 4.8 5:95 | 20 20:80 | 20 20:80 |
| ML [Parts/magnetic | VC | 10 | 10 | 5 | 5 |
|  | UR | 5 | 5 | 3 | 3 |
|  | HA | 5 | 5 | 1 | 1 |
| powder | Totals | 20 | 20 | 9 | 9 |
| NML [parts/main | VC | 7.6 | 7.6 | 10 | 10 |
|  | UR | 4.8 | 4.8 | 5 | 5 |
|  | HA | 4.8 | 4.8 | 3 | 3 |
| powder + carbon] | Totals | 17.2 | 17.2 | 18 | 18 |
| B(U)/B(L) Evaluations and Results |  | 1.1628 | 1.1628 | 0.5 | 0.5 |
| Reproduction output | [dB] | 0 | 0.3 | 0.8 | 2.6 |
| CNR | [dB] | 0 | 0.6 | 0.9 | 3.1 |
| Frictional coefficient |  | 0.27 | 0.25 | 0.28 | 0.4 |

NML: Nonmagnetic Layer
ML: Magnetic Layer
YM: Young modulus
AH: Acicular hematite
VC: Vinyl chloride
UR: Urethane
HA: Hardening agent Explanation of Examples and Comparative Examples A Comparative Example 1 was used as a standard (0 dB) for electromagnetic characteristics. This corresponds to the example 1 in Japanese unexamined Patent Publication (KOKAI) Heisei No. 8-339,526 except the magnetic powder of the magnetic layer. The standard evaluations were based on whether or not the CNR was improved to 3 dB or higher (generally, one digit influence to an error rate with respect to 2 dB,) and on whether or not the coefficient of friction is not over 0.3.

Example 1 was a standard sample of the present invention, and a high CNR and a low frictional coefficient were obtained.

Example 2 was a sample having PDS of the base relatively high within the range of the present invention, and having relatively small values of the thicknesses of the magnetic layer and the nonmagnetic layer. Although an output was low since the thickness of the magnetic layer is thin, noises were low also and an enough CNR was obtained.

Example 3 was a sample having PDS of the base relatively low within the range of the present invention, and having relatively large values of the thicknesses of the magnetic layer and the nonmagnetic layer. It showed a CNR close in value to Example 1, but had a high coefficient of friction due to less influence by the roughness of the base.

Example 4 was a sample using an aramid base having a relatively low value of the PDS within the range of the present invention. The length of the major axis of the nonmagnetic powder was short and the carbon-black containing ratio of the nonmagnetic layer was low. The output was somewhat improved in comparison with that of Example 1 (since head touch pressure became high).

Example 5 was a sample having a relatively low value of the PDS within the range of the present invention and a base having a low ratio, MD/TD, of the Young's modulus. The length of the major axis of each nonmagnetic powder (hematite) was around upper limit, and the carbon-black containing ratio of the nonmagnetic layer was relatively high, but within the range mentioned in the aforementioned preferred embodiment (II). Because a length of the major axis of the nonmagnetic powder was long, the magnetic surface became somewhat rough. The base TD of the ratio of the Young's modulus was low, thereby lowering the head touch pressure, and therefore the CNR was made to be lower than that of example 1.

Example 6 was a sample having a larger binder amount of the magnetic layer and the nonmagnetic layer than that of Example 1. The output and CNR was lower than those of Example 1, but within the range mentioned in the aforementioned preferred embodiment (III).

Comparative example 2 was a sample as same as that of Comparative example 1 except that the kind of nonmagnetic powder and the thicknesses of the magnetic layer and the nonmagnetic layer are the same as those of Example 1. The both output and CNR were far inferior to those of Example 1.

Comparative example 3 was a sample as same as that of example 1 except that the base is the same as that of Comparative example 1. The both output and CNR were far inferior to those of Example 1.

Comparative example 4 was the same sample as Example 1, except that the base roughness was made to be smaller than the range of the present invention and the ratio of the MD Young's modulus was made to be larger than that of TD Young's modulus. The output and CNR were the same as Example 6, but the coefficient of friction was too much high.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:
1. A magnetic recording medium comprising:
a flexible nonmagnetic support;
a nonmagnetic layer containing a nonmagnetic powder and a binder formed on the flexible nonmagnetic support, and
a magnetic layer containing a ferromagnetic powder and a binder formed on the nonmagnetic layer,
wherein the nonmagnetic layer has an average thickness of 0.5 $\mu$m or less, and
the magnetic layer has an average thickness of from 0.01 or more to 0.3 $\mu$m or less,
and wherein, according to a roughness spectrum measured with an atomic force microscope, a surface of the flexible nonmagnetic support to which the nonmagnetic layer and the magnetic layer are formed has a PSD equal to or less than 0.5 nm$^2$ in the wavelength of from 1 to 5 $\mu$m and 0.02 to 0.5 nm$^2$ in the wavelength of from 0.5 $\mu$m or higher to less than 1 $\mu$m; and the flexible nonmagnetic support has a ratio, MD/TD of Young's modulus in the direction of MD to the direction of TD of 1/5 or higher to 1/1 or lower.

2. The magnetic recording medium according to claim 1, wherein the nonmagnetic powder contained in the nonmagnetic layer is an acicular nonmagnetic powder having a mean length of a major axis of 0.2 $\mu$m or less.

3. The magnetic recording medium according to claim 1, wherein the nonmagnetic layer contains carbon black having an average primary particle site of 30 nm or less and an oil absorption amount of 200 ml/100 g or less in a ratio ranging from 5:95 to 30:70 with respect to the nonmagnetic powder.

4. The magnetic recording medium according to claim 2, wherein the nonmagnetic layer contains carbon black having an average primary particle size of 30 nm or less and an oil absorption amount of 200 ml/100 g or less in a ratio ranging from 5:95 to 30:70 with respect to the nonmagnetic powder.

5. The magnetic recording medium according to claim 1, wherein the binder contained in the nonmagnetic layer has a molecular weight ranging from 20,000 to 50,000 and one or more polar groups selected from groups constituted of —SO$_3$M, —COOM, —OSO$_3$M, —PO(OM)$_2$ and —OPO(OM)$_2$ (wherein M indicates a hydrogen atom, an alkali metal ion or an ammonium ion), wherein a content of the binder in the nonmagnetic layer is 12 to 30 parts with respect to the 100-part-total amount of the nonmagnetic powder and carbon black, and wherein a content of the binder in the nonmagnetic layer is larger than that of the binder in the magnetic layer.

6. The magnetic recording medium according to claim 2, wherein the binder contained in the nonmagnetic layer has a molecular weight ranging from 20,000 to 50,000 and one or more polar groups selected from groups constituted of —SO$_3$M, —COOM, —OSO$_3$M, —PO(OM)$_2$ and —OPO(OM)$_2$ (wherein M indicates a hydrogen atom, an alkali metal ion or an ammonium ion), wherein a content of the binder in the nonmagnetic layer is 12 to 30 parts with respect to the 100-part-total amount of the nonmagnetic powder and carbon black, and wherein a content of the binder in the nonmagnetic layer is larger than that of the binder in the magnetic layer.

7. The magnetic recording medium according to claim 3, wherein the binder contained in the nonmagnetic layer has a molecular weight ranging from 20,000 to 50,000 and one or more polar groups selected from groups constituted of —SO$_3$M, —COOM, —OSO$_3$M, —PO(OM)$_2$ and —OPO(OM)$_2$ (wherein M indicates a hydrogen atom, an alkali metal ion or an ammonium ion), wherein a content of the binder in the nonmagnetic layer is 12 to 30 parts with respect to the 100-part-total amount of the nonmagnetic powder and carbon black, and wherein a content of the binder in the nonmagnetic layer is larger than that of the binder in the magnetic layer.

8. The magnetic recording medium according to claim 4, wherein the binder contained in the nonmagnetic layer has a molecular weight ranging from 20,000 to 50,000 and one or more polar groups selected from groups constituted of —SO₃M, —COOM, —OSO₃M, —PO(OM)₂ and —OPO(OM)₂ (wherein M indicates a hydrogen atom, an alkali metal ion or an ammonium ion), wherein a content of the binder in the nonmagnetic layer is 12 to 30 parts with respect to the 100-part-total amount of the nonmagnetic powder and carbon black, and wherein a content of the binder in the nonmagnetic layer is larger than that of the binder in the magnetic layer.

9. The magnetic recording medium according to claim 1, wherein the thickness of the magnetic layer is in the range of from 0.01 to 0.2 μm.

10. The magnetic recording medium according to claim 1, wherein the thickness of the magnetic layer is in the range of from 0.01 to 0.1 μm.

11. The magnetic recording medium according to claim 1, wherein the average thickness of the nonmagnetic layer is in the range of from 0.2 to 0.5 μm.

12. The magnetic recording medium according to claim 1, wherein the PSD in the wavelength of from 1 to 5 μm is equal to or less than 0.4 nm².

13. The magnetic recording medium according to claim 1, wherein the PSD in the wavelength of from 1 to 5 μm is equal to or less than 0.3 nm².

14. The magnetic recording medium according to claim 1, wherein the PSD in the wavelength of from 0.5 μm to 1 μm ranges from 0.4 to 0.3 nm².

15. The magnetic recording medium according to claim 1, wherein the ratio, MD/TD, of Young's modulus in the MD direction to the TD direction of the flexible nonmagnetic support is from 1/1 to 1/3.

16. The magnetic recording medium according to claim 1, wherein the flexible nonmagnetic support has, in the case of a tape, a Young's modulus in the MD direction of 400 to 1500 kg/mm², and a Young's modulus in the TD direction of 500 to 2000 kg/mm².

17. The magnetic recording medium according to claim 1, wherein the flexible nonmagnetic support has, in the case of a tape, a Young's modulus in the MD direction of 500 to 1300 kg/mm², and a Young's modulus in the TD direction of 700 to 1800 kg/mm².

18. The magnetic recording medium according to claim 1, wherein the coercive force Hc of the magnetic layer ranges from 1800 to 3500 Oe.

19. The magnetic recording medium according to claim 1, wherein the ferromagnetic powder is an alloy powder having σs in the range of from 140 emu/g to 160 emu/g.

20. The magnetic recording medium according to claim 1, wherein the nonmagnetic powder is an acicular nonmagnetic powder having a mean length of major axis of 0.15 μm or less, and the acicular ratio of 3 to 10.

* * * * *